(12) United States Patent
Cilfone et al.

(10) Patent No.: US 10,505,915 B2
(45) Date of Patent: Dec. 10, 2019

(54) DETERMINING WHETHER TO COMPRESS A DATA SEGMENT IN A DISPERSED STORAGE NETWORK

(71) Applicant: International Business Machines Corporation, Armonk, NY (US)

(72) Inventors: Bart R. Cilfone, Marina del Rey, CA (US); Wesley B. Leggette, Chicago, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 16/136,761

(22) Filed: Sep. 20, 2018

(65) Prior Publication Data

US 2019/0034085 A1    Jan. 31, 2019

Related U.S. Application Data

(63) Continuation of application No. 15/427,860, filed on Feb. 8, 2017, now Pat. No. 10,162,524, which is a
(Continued)

(51) Int. Cl.
*G06F 11/10* (2006.01)
*H04L 29/06* (2006.01)
(Continued)

(52) U.S. Cl.
CPC .............. *H04L 63/08* (2013.01); *G06F 3/064* (2013.01); *G06F 3/067* (2013.01); *G06F 3/0619* (2013.01);
(Continued)

(58) Field of Classification Search
CPC .................................................. G06F 11/1076
(Continued)

(56) References Cited

U.S. PATENT DOCUMENTS 4,092,732 A    5/1978    Ouchi
5,454,101 A    9/1995    Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Fritz Alphonse
(74) *Attorney, Agent, or Firm* — Garlick & Markison; Timothy W. Markison; Timothy D. Taylor

(57) ABSTRACT

A method for execution by a computing device of a dispersed storage network (DSN) begins by receiving a data segment for dispersed storage error encoding. Prior to encoding, the method continues by determining whether to compress the data segment by predicting a first estimated processing cost (EPC) based on EPCs to dispersed storage error decode a compressed set of encoded data slices to recover a compressed data segment and EPCs to decompress the compressed data segment to recover the data segment and by predicting a second EPC based on EPCs to dispersed storage error decode the set of encoded data slices to recover the data segment. When the first EPC compares favorably to the second EPC, the method continues by compressing the data segment to produce the compressed data segment and dispersed storage error encoding the compressed data segment to produce the compressed set of encoded data slices.

12 Claims, 6 Drawing Sheets

Related U.S. Application Data continuation-in-part of application No. 14/843,022, filed on Sep. 2, 2015, now Pat. No. 9,602,496, which is a continuation of application No. 14/148,198, filed on Jan. 6, 2014, now Pat. No. 9,143,499, which is a continuation of application No. 13/180,675, filed on Jul. 12, 2011, now Pat. No. 8,627,144.

(60) Provisional application No. 61/369,812, filed on Aug. 2, 2010.

(51) Int. Cl.

| | | |
|---|---|---|
| *G06F 3/06* | (2006.01) | |
| *H04L 29/08* | (2006.01) | |
| *G06F 21/62* | (2013.01) | |
| *H04L 1/00* | (2006.01) | |
| *H03M 13/15* | (2006.01) | |
| *H03M 13/00* | (2006.01) | |

(52) U.S. Cl.
CPC ........ *G06F 3/0689* (2013.01); *G06F 11/1076* (2013.01); *G06F 21/6218* (2013.01); *H04L 1/0057* (2013.01); *H04L 1/0061* (2013.01); *H04L 67/04* (2013.01); *H04L 67/10* (2013.01); *H04L 67/1097* (2013.01); *H04L 67/306* (2013.01); *H04L 69/22* (2013.01); *H03M 13/1515* (2013.01); *H03M 13/6312* (2013.01)

(58) Field of Classification Search
USPC .......................................... 714/764, 766, 763
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 9,047,217 | B2 * | 6/2015 | Grube ................. G06F 11/1092 |
| 9,081,715 | B2 * | 7/2015 | Grube ................. H04L 67/1097 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0091337 | A1 | 4/2005 | Reasor et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2009/0323487 | A1 | 12/2009 | Chen et al. |
| 2010/0023524 | A1 | 1/2010 | Gladwin et al. |
| 2010/0037056 | A1 | 2/2010 | Follis et al. |
| 2010/0037060 | A1 | 2/2010 | Irvine |
| 2010/0199089 | A1 | 8/2010 | Vysogorets et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

(56) References Cited

OTHER PUBLICATIONS

Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

DETERMINING WHETHER TO COMPRESS A DATA SEGMENT IN A DISPERSED STORAGE NETWORK

CROSS-REFERENCE TO RELATED APPLICATIONS

The present U.S. Utility patent application claims priority pursuant to 35 U.S.C. § 120 as a continuation of U.S. Utility application Ser. No. 15/427,860, entitled "DETERMINING WHETHER TO COMPRESS A DATA SEGMENT IN A DISPERSED STORAGE NETWORK," filed Feb. 8, 2017, which is a continuation-in-part of U.S. Utility application Ser. No. 14/843,022, entitled "AUTHENTICATING A DATA ACCESS REQUEST TO A DISPERSED STORAGE NETWORK", filed Sep. 2, 2015, issued as U.S. Pat. No. 9,602,496 on Mar. 21, 2017, which is a continuation of U.S. Utility application Ser. No. 14/148,198, entitled "AUTHENTICATING A DATA ACCESS REQUEST TO A DISPERSED STORAGE NETWORK", filed Jan. 6, 2014, issued as U.S. Pat. No. 9,143,499 on Sep. 22, 2015, which is a continuation of U.S. Utility application Ser. No. 13/180,675, entitled "AUTHENTICATING A DATA ACCESS REQUEST TO A DISPERSED STORAGE NETWORK", filed Jul. 12, 2011, issued as U.S. Pat. No. 8,627,114 on Jan. 7, 2014, which claims priority pursuant to 35 U.S.C. § 119(e) to U.S. Provisional Application No. 61/369,812, entitled "DISPERSED STORAGE NETWORK ACCESS REQUEST AUTHENTICATION", filed Aug. 2, 2010, now expired, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

As is further known, data may be compressed, encrypted, and may have an integrity codec applied to it for faster processing, increased security, and other advantages.

BRIEF DESCRIPTION OF THE SEVERAL VIEWS OF THE DRAWING(S)

DETAILED DESCRIPTION OF THE INVENTION

Figure 1:
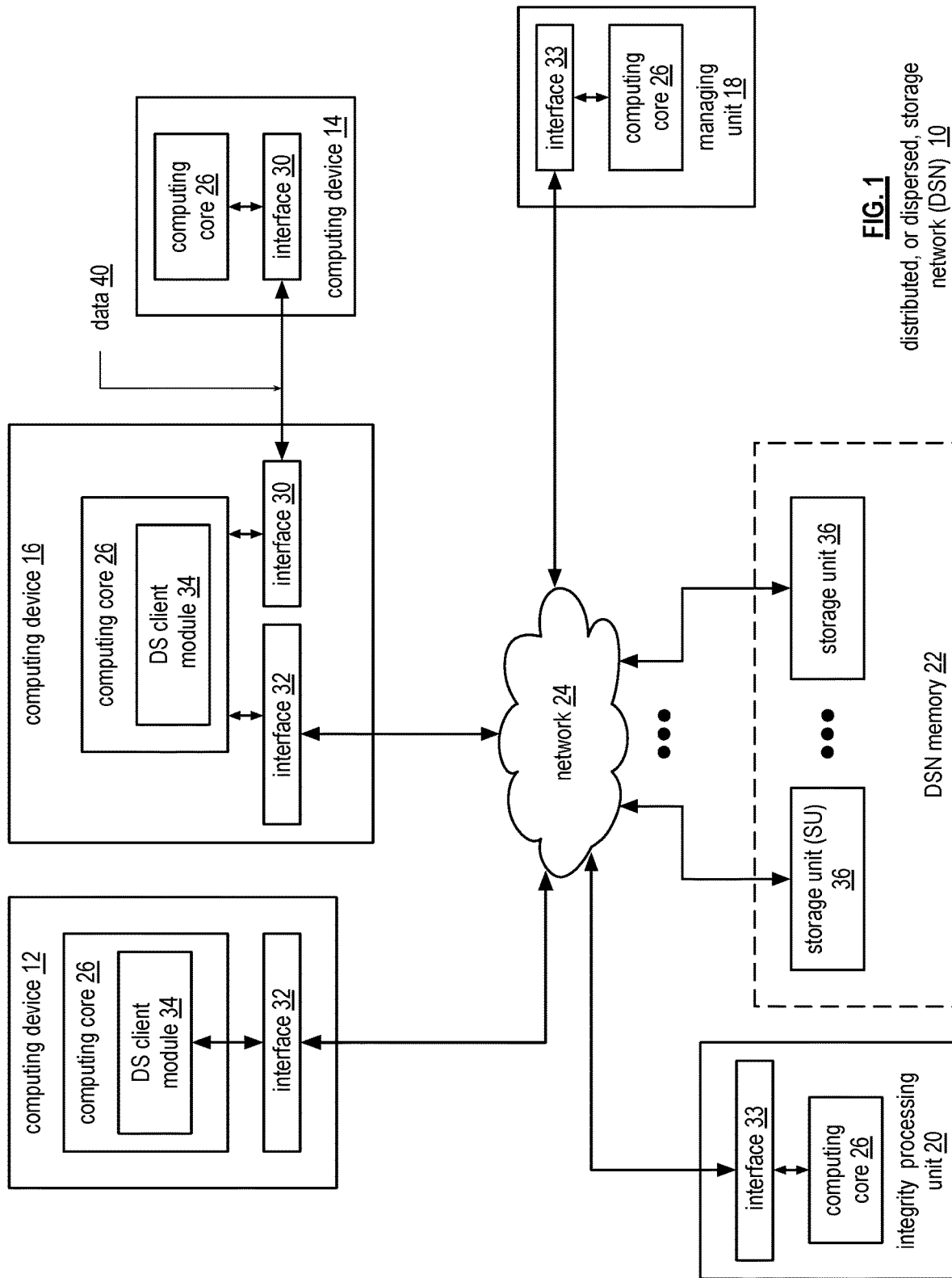
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
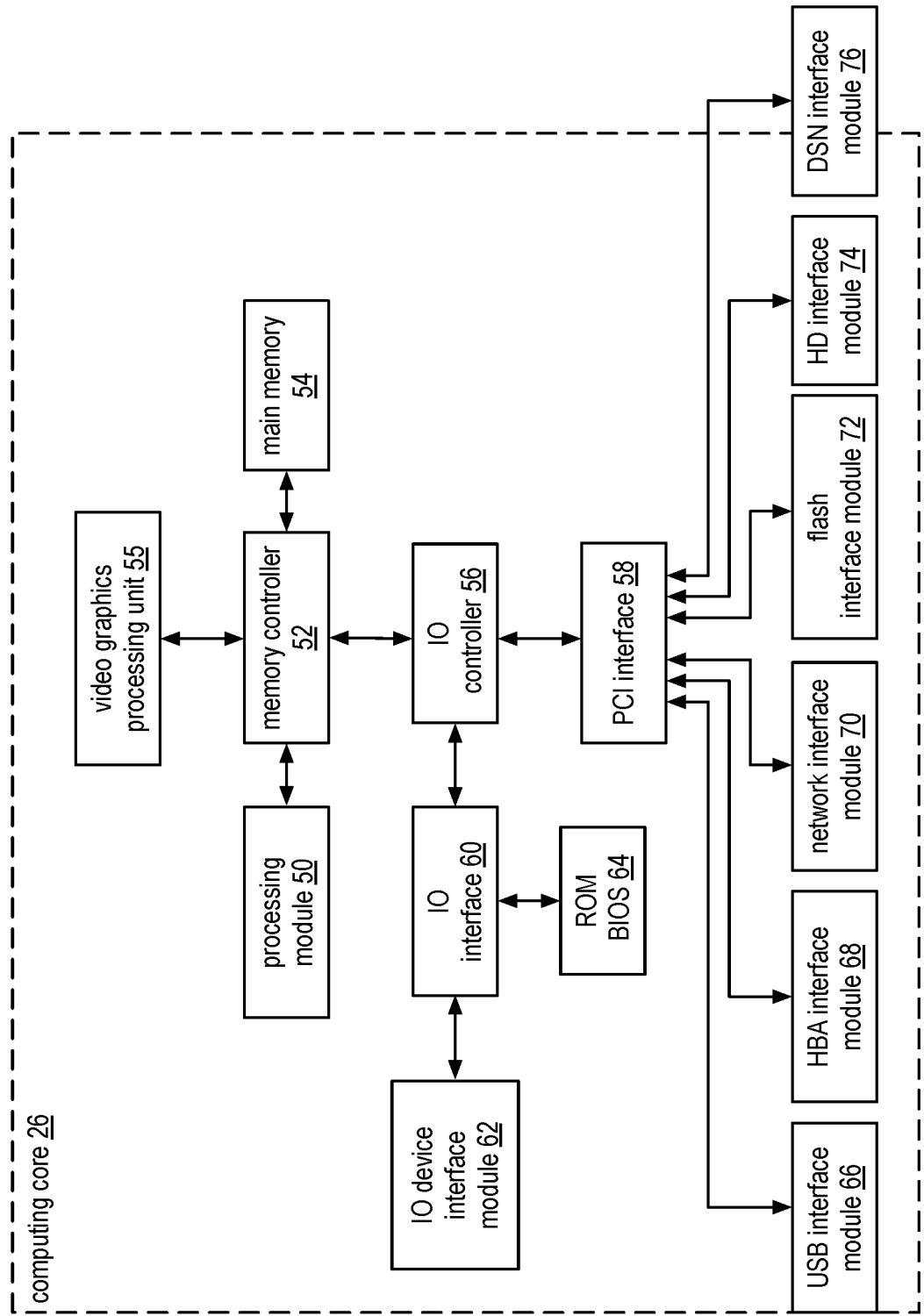
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data 40 as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4, 5, 6:
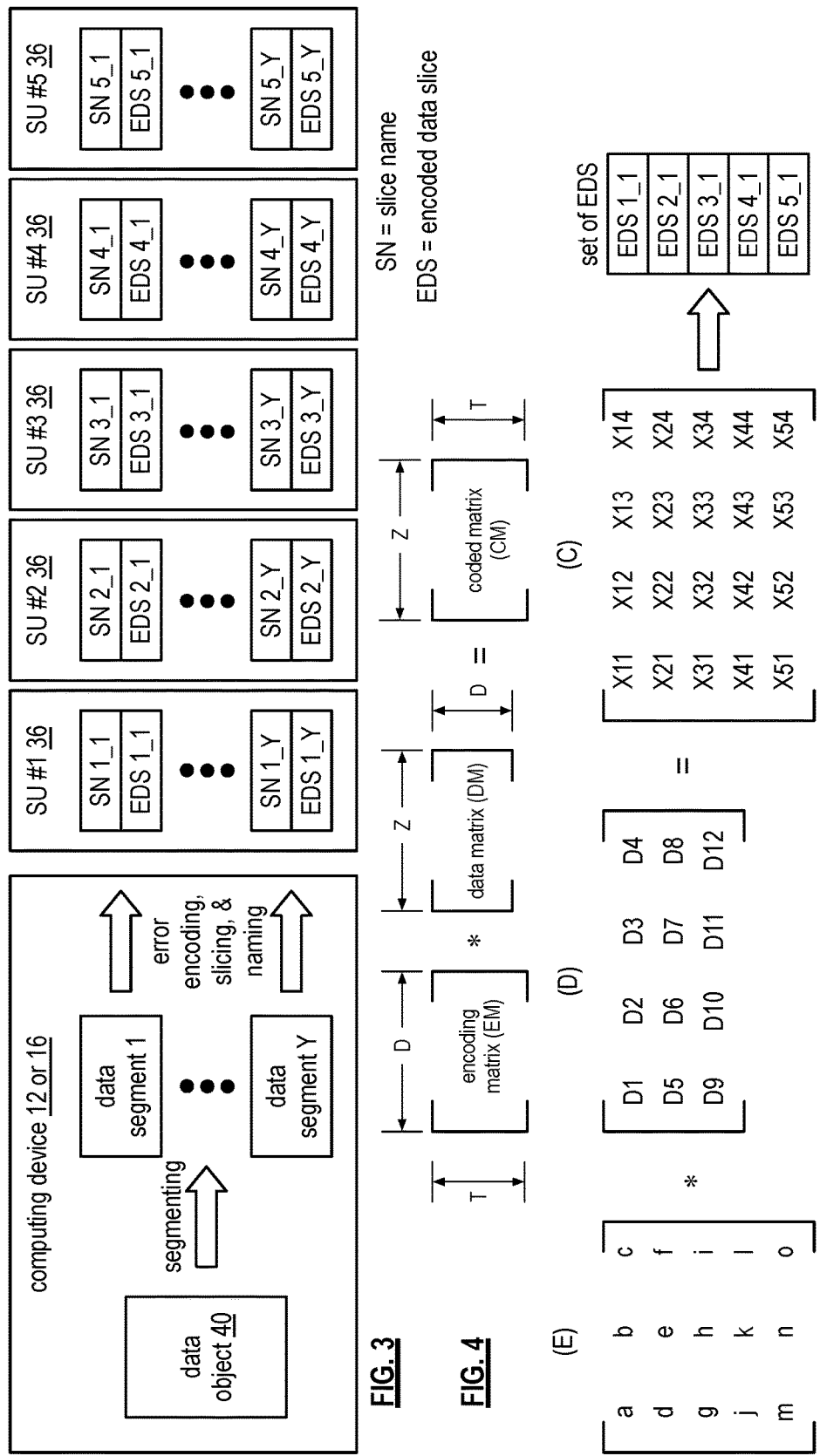
FIG. 3 is a schematic block diagram of an example of dispersed storage error encoding of data in accordance with the present invention.
FIG. 4 is a schematic block diagram of a generic example of an error encoding function in accordance with the present invention.
FIG. 5 is a schematic block diagram of a specific example of an error encoding function in accordance with the present invention.
FIG. 6 is a schematic block diagram of an example of a slice name of an encoded data slice (EDS) in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
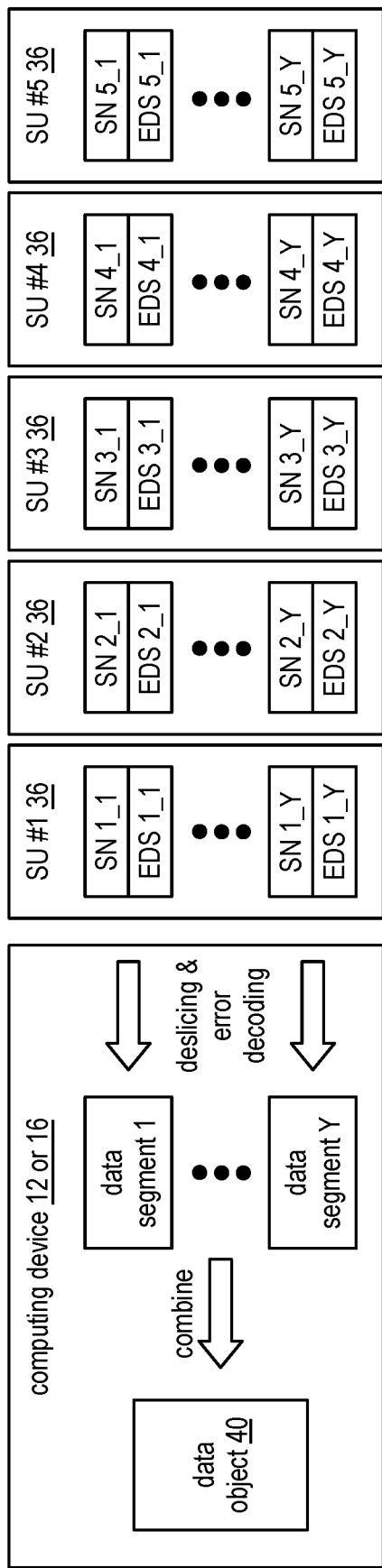
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
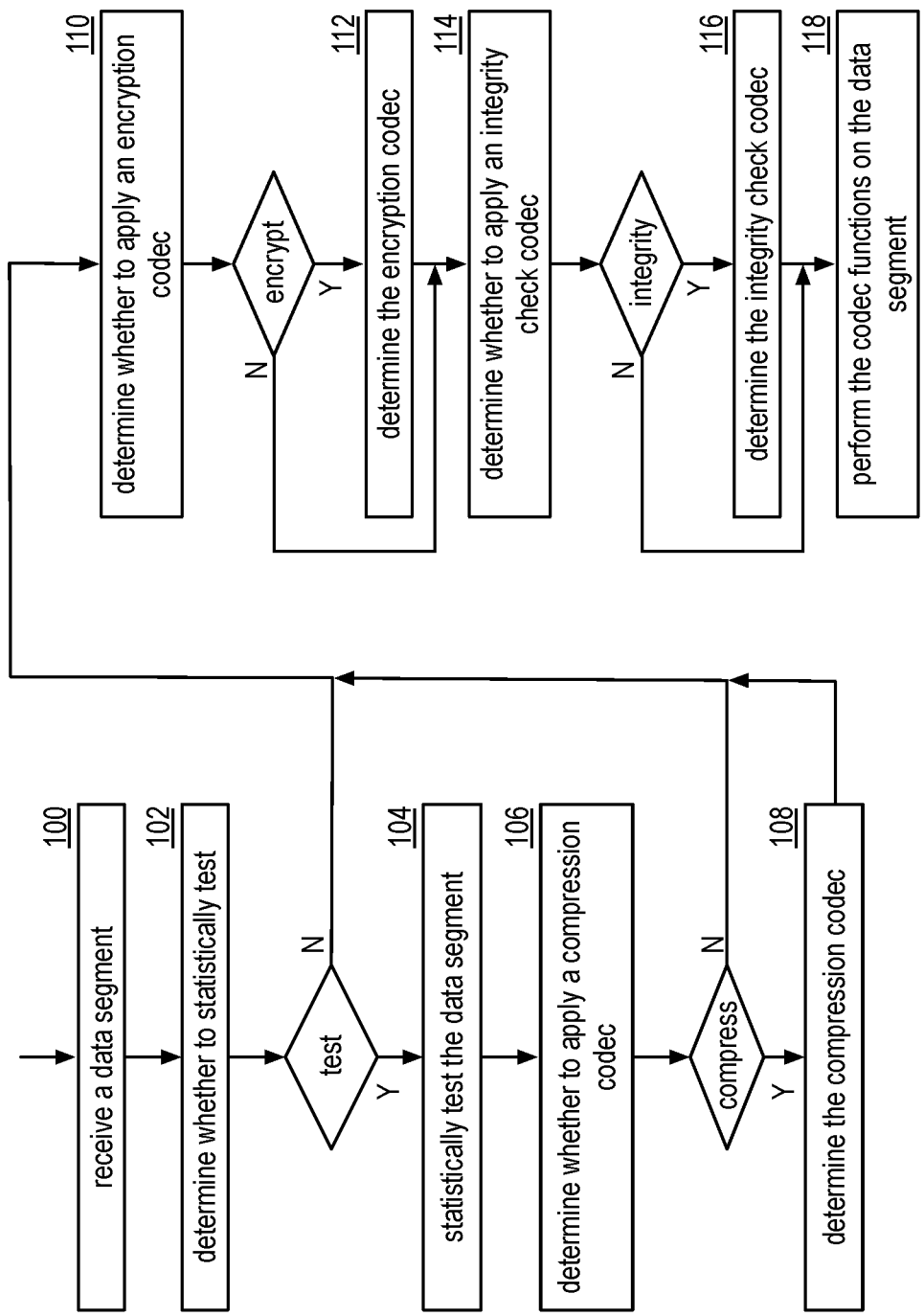
FIG. 9 is a logic flow diagram of an example of a method of manipulating pre-slice data in accordance with the present invention.

FIG. 9 is a flowchart illustrating an example of manipulating pre-slice data. The method begins with step 100 where a processing module (e.g., of a dispersed storage (DS)

processing unit) receives a data segment. For example, a processing module receives the data segment with metadata associated with the data segment. The metadata may include one or more of a data object name, a data object type, magic values, header information, data object content attributes, data object size, a user identifier (ID), a priority indicator, a security indicator, an integrity check indicator, an encryption indicator, a compression indicator, and a performance indicator. The method continues at step 102 where the processing module determines whether to statistically test the data segment. The determination may be based on the metadata. For example, the processing module determines to not statistically test the data segment when the metadata indicates that a file name extension is associated with a data object type that is already compressed. The method branches to step 110 when the processing module determines to not statistically test the data segment. The method continues to step 104 when the processing module determines to statistically test the data segment.

The method continues at step 104 where the processing module statistically tests the data segment to determine compressibility. For example, the processing module compresses a portion of the data segment and compares a resulting compressed portion to the portion to determine if the difference is more than a compressibility threshold. The method continues at step 106 where the processing module determines whether to apply a compression codec based on the statistical test. For example, the processing module determines to not apply the compression codec when the statistical test indicates that the difference between the compressed portion and a portion is less than the compressibility threshold. The method branches to step 110 when the processing module determines to not apply the compression codec. The method continues to step 108 when the processing module determines to apply the compression codec. The method continues at step 108 where the processing module determines the compression codec when the processing module determines to apply the compression codec. The determination may be based on one or more of the statistical test (e.g., compressibility), a compression codec table lookup, a compression codec matching algorithm, a message, and a command.

The method continues at step 110 where the processing module determines whether to apply an encryption codec based on determining whether the data segment is already encrypted. For example, the processing module analyzes the data segment to determine a randomness factor and compares the randomness factor to a randomness threshold. Next, the processing module indicates to apply the encryption codec when the comparison indicates that the randomness factor is greater than the randomness threshold. As another example, the processing module determines that the data segment is encrypted based on the security indicator and/or encryption indicator of the metadata. The method branches to step 114 when the processing module determines to not apply the encryption codec. The method continues to step 112 when the processing module determines to apply the encryption codec. The method continues at step 112 where the processing module determines the encryption codec when the processing module determines to apply the encryption codec. The determination may be based on one or more of the randomness factor, the security indicator, the encryption indicator, an encryption codec table lookup, an encryption codec matching algorithm, a message, and a command.

The method continues at step 114 where the processing module determines whether to apply an integrity check codec based on determining whether an integrity check has already been applied to the data segment. For example, the processing module analyzes the data segments to determine if one or more of a signature, a hash, a checksum have been applied. As another example, the processing module determines that the integrity check has already been applied to the data segment based on the integrity check indicator of the metadata. The method branches to step 118 when the processing module determines to not apply the integrity check codec. The method continues to step 116 when the processing module determines to apply the integrity check codec. The method continues at step 116 where the processing module determines the integrity check codec when the processing module determines to apply the integrity check codec. The determination may be based on one or more of the integrity check determination, the integrity check indicator, an integrity check codec table lookup, an integrity check codec matching algorithm, a message, and a command.

The method continues at step 118 where the processing module performs the codec functions on the data segment in accordance with the compression codec, the encryption codec, and the integrity check codec as previously determined. For example, the processing module applies all three codec types to the data segment when all three codec types are desired. As another example, the processing module applies none of the three codec types to the data segment when none of the codec types are desired. As yet another example, the processing module applies one codec type but not the other two codec types. In addition, the processing module may update a codec stack to indicate the ordering of the codec functions as applied to the data segment to enable subsequent post-slice data de-manipulation in the reverse order. The method may continue to apply more codecs to the data segment in the same or more categories. For example, the processing module may apply the compression codec, the encryption codec, a second encryption codec and the integrity check codec.

Figure 10:
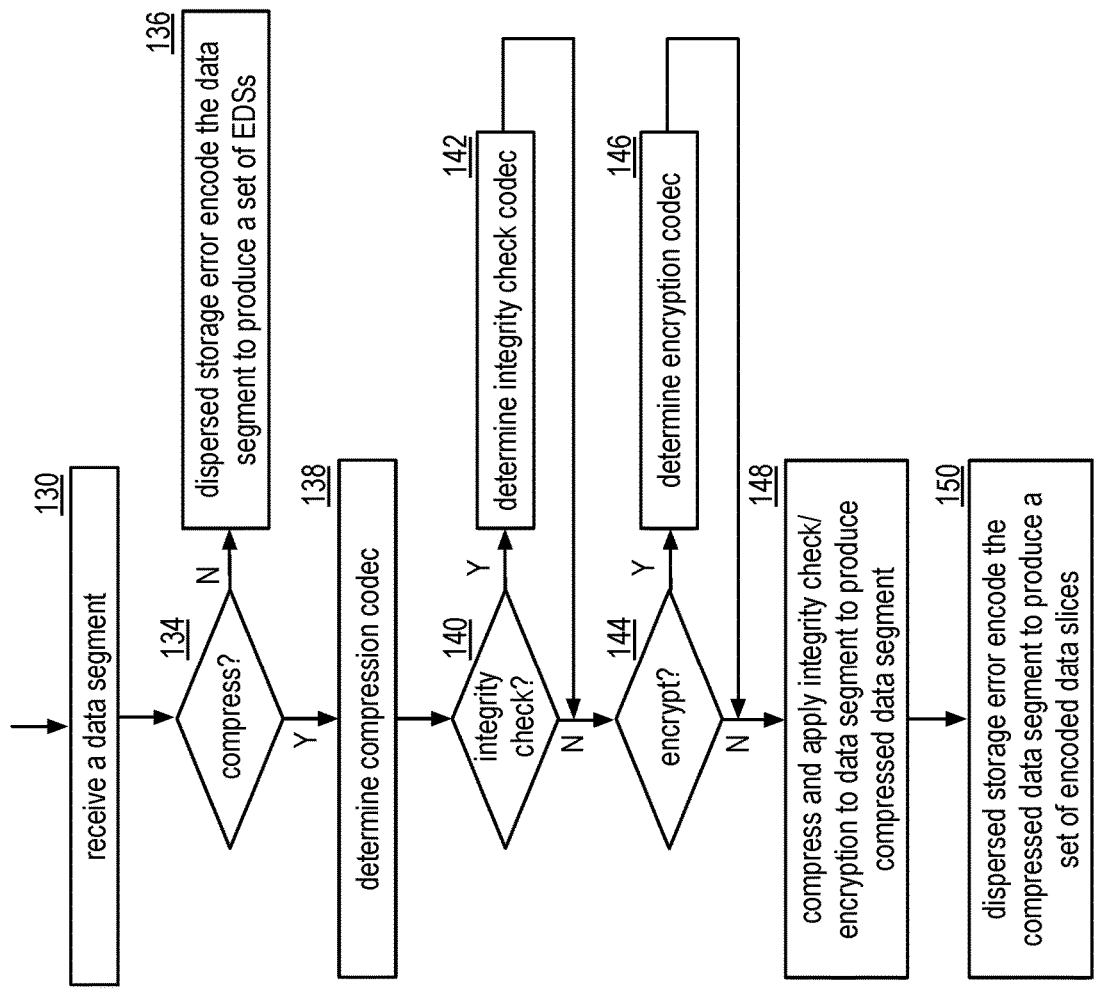
FIG. 10 is a logic flow diagram of an example of a method of determining whether to compress a data segment in accordance with the present invention.

FIG. 10 is a logic flow diagram of an example of a method of determining whether to compress a data segment. The method begins with step 130, where a computing device receives a data segment of a data object for dispersed storage error encoding. Prior to the dispersed storage error encoding, the method continues with step 134, where the computing device determines whether to compress the data segment. For example, the computing device predicts a first estimated processing cost based on estimated processing costs to compress the data segment to produce a compressed data segment and estimated processing costs to dispersed storage error encode the compressed data segment and predicts a second estimated processing cost based on estimated processing costs to dispersed storage error encode the data segment. As another example, the computing device determines whether to compress the data segment by determining whether the data segment has previously undergone a compression function. When the data segment has previously undergone a compression function, the computing device determines that the first estimated processing cost compares unfavorably to the second estimated processing cost and when the first estimated processing cost compares unfavorably to the second estimated processing cost, foregoes the compressing of the data segment.

When the first estimated processing cost compares favorably to the second estimated processing cost, the method continues to step 138. When the first estimated processing cost does not compare favorably to the second estimated processing cost, the method branches to step 136, where the computing device dispersed storage error encodes the data segment to produce a set of encoded data slices. The method continues with step 138, where the computing device determines a compression codec. For example, the computing device determines a compression codec and compresses the data segment in accordance with the compression codec to produce a compressed data segment.

Alternatively, prior to compressing the data segment, the method continues with step 140, where the computing device determines whether to produce an integrity check for the data segment. When the computing device determines to produce the integrity check for the data segment, the method continues at step 142, where the computing device determines an integrity check codec. When the computing device determines not to produce the integrity check for the data segment, the method continues to step 144, where prior to compressing the data segment, the computing device determines whether to encrypt the data segment. For example, the computing device searches for the presence of a digital signature or hash value present in the data segment to determine whether to encrypt the data segment. As another example, the computing device determines the data's Multipurpose Internet Mail Extension (MIME) type suggests an encrypted container, and thus determines not to encrypt the data segment. When the computing device determines to encrypt the data segment, the method branches to step 146, where the computing device determines an encryption codec.

When the computing device determines not to encrypt the data segment, the method continues to step 148, where the computing device compresses the data segment and performs one or more of an integrity check codec and an encryption codec on the data segment to produce a compressed data segment. For example, the computing device determines to compress the data segment and performs an encryption codec on the data segment, but does not perform an integrity check codec on the data segment, to produce the compressed data segment. As another example, the computing device compresses the data segment and performs an integrity check codec on the data segment, but does not perform an encryption codec on the data segment, to produce the compressed data segment. As a yet further example, the computing device only performs the compression codec on the data segment to produce the compressed data segment. The method continues at step 150, where the computing device dispersed storage error encodes the compressed data segment to produce a set of encoded data slices.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN), the method comprises:
   receiving a data segment of a data object for dispersed storage error encoding;
   prior to the dispersed storage error encoding, determining whether to compress the data segment by:
      predicting a first estimated processing cost based on estimated processing costs to dispersed storage error decode a compressed set of encoded data slices to recover a compressed data segment and estimated processing costs to decompress the compressed data segment to recover the data segment, wherein the data segment is compressed to produce the compressed data segment, and wherein the compressed data segment is dispersed storage error encoded to produce the compressed set of encoded data slices;
      predicting a second estimated processing cost based on estimated processing costs to dispersed storage error decode a set of encoded data slices to recover the data segment, wherein the data segment is dispersed storage error encoded to produce the set of encoded data slices; and
   when the first estimated processing cost compares favorably to the second estimated processing cost:
      compressing the data segment to produce the compressed data segment; and
      dispersed storage error encoding the compressed data segment to produce the compressed set of encoded data slices.

2. The method of claim 1, wherein the determining whether to compress the data segment further comprises:
   determining whether the data segment has previously undergone a compression function; and
   when the data segment has previously undergone a compression function, determining that the first estimated processing cost compares unfavorably to the second estimated processing cost; and when the first estimated processing cost compares unfavorably to the second estimated processing cost, foregoing the compressing of the data segment.

3. The method of claim 1, wherein the compressing the data segment comprises:
   determining a compression codec; and
   compressing the data segment in accordance with the compression codec to produce the compressed data segment.

4. The method of claim 1 further comprises:
   prior to compressing the data segment:
      determining whether to encrypt the data segment; and
      when determined to encrypt the data segment, determining an encryption codec; and
   performing the encryption codec and a compression codec on the data segment to produce the compressed data segment.

5. The method of claim 1 further comprises:
   prior to compressing the data segment:
      determining whether to produce an integrity check for the data segment; and
      when determined to produce the integrity check for the data segment, determining an integrity check codec; and
   performing the integrity check codec and a compression codec on the data segment to produce the compressed data segment.

6. The method of claim 1 further comprises:
   prior to compressing the data segment:
      determining whether to produce an integrity check for the data segment;
      when determined to produce the integrity check for the data segment, determining an integrity check codec;
      determining whether to encrypt the data segment; and
      when determined to encrypt the data segment, determining an encryption codec; and
   performing the integrity check codec, the encryption codec, and a compression codec on the data segment to produce the compressed data segment.

7. A computing device comprises:
   memory;
   an interface; and
   a processing module operably coupled to the memory and the interface, wherein the processing module is operable to:
   receive a data segment of a data object for dispersed storage error encoding;
   prior to the dispersed storage error encoding, determine whether to compress the data segment by:
      predicting a first estimated processing cost based on estimated processing costs to dispersed storage error decode a compressed set of encoded data slices to recover a compressed data segment and estimated processing costs to decompress the compressed data segment to recover the data segment, wherein the data segment is compressed to produce the compressed data segment, and wherein the compressed data segment is dispersed storage error encoded to produce the compressed set of encoded data slices;
      predicting a second estimated processing cost based on estimated processing costs to dispersed storage error decode a set of encoded data slices to recover the data segment, wherein the data segment is dispersed storage error encoded to produce the set of encoded data slices; and
   when the first estimated processing cost compares favorably to the second estimated processing cost:
      compressing the data segment to produce the compressed data segment; and
      dispersed storage error encoding the compressed data segment to produce the compressed set of encoded data slices.

8. The computing device of claim 7, wherein the processing module is further operable to determine whether to compress the data segment by:
   determining whether the data segment has previously undergone a compression function; and
   when the data segment has previously undergone a compression function, determining that the first estimated processing cost compares unfavorably to the second estimated processing cost; and
   when the first estimated processing cost compares unfavorably to the second estimated processing cost, foregoing the compressing of the data segment.

9. The computing device of claim 7, wherein the processing module is further operable to compress the data segment by:
   determining a compression codec; and
   compressing the data segment in accordance with the compression codec to produce the compressed data segment.

10. The computing device of claim 7, wherein the processing module is further operable to:
    prior to compressing the data segment:
       determine whether to encrypt the data segment; and
       when determined to encrypt the data segment, determine an encryption codec; and
    perform the encryption codec and a compression codec on the data segment to produce the compressed data segment.

11. The computing device of claim 7, wherein the processing module is further operable to:
    prior to compressing the data segment:
       determine whether to produce an integrity check for the data segment; and
       when determined to produce the integrity check for the data segment, determine an integrity check codec; and
    perform the integrity check codec and a compression codec on the data segment to produce the compressed data segment.

12. The computing device of claim 7, wherein the processing module is further operable to:
    prior to compressing the data segment:
       determine whether to produce an integrity check for the data segment;
       when determined to produce the integrity check for the data segment, determine an integrity check codec;
       determine whether to encrypt the data segment; and
       when determined to encrypt the data segment, determine an encryption codec; and
    perform the integrity check codec, the encryption codec, and a compression codec on the data segment to produce the compressed data segment.

* * * * *